United States Patent
Yu et al.

(10) Patent No.: US 7,696,701 B2
(45) Date of Patent: Apr. 13, 2010

(54) POWER SUPPLY FOR HALOGEN LAMP HAVING AN INVERTER AND OUTPUT CIRCUIT

(75) Inventors: Qinghong Yu, Salem, MA (US); Joseph L. Parisella, Beverly, MA (US)

(73) Assignee: Osram Sylvania Inc., Danvers, MA (US)

(*) Notice: Subject to any disclaimer, the term of this patent is extended or adjusted under 35 U.S.C. 154(b) by 43 days.

(21) Appl. No.: 11/696,978

(22) Filed: Apr. 5, 2007

(65) Prior Publication Data

US 2008/0246409 A1 Oct. 9, 2008

(51) Int. Cl.
*H05B 37/02* (2006.01)
(52) U.S. Cl. ............ 315/224; 315/209 R; 315/291; 315/307; 315/274
(58) Field of Classification Search ............ 315/224, 315/225, 209 R, 246, 247, 248, 209 CD, 315/194
See application file for complete search history.

(56) References Cited

U.S. PATENT DOCUMENTS

| | | | | |
|---|---|---|---|---|
| 5,932,976 A | * | 8/1999 | Maheshwari et al. | 315/291 |
| 6,111,230 A | * | 8/2000 | Cao et al. | 219/501 |
| 6,351,074 B1 | * | 2/2002 | Ito et al. | 315/82 |
| 7,439,691 B2 | * | 10/2008 | Sugaya et al. | 315/308 |
| 2003/0006720 A1 | * | 1/2003 | Borella et al. | 315/291 |
| 2003/0094907 A1 | * | 5/2003 | Nerone et al. | 315/224 |
| 2007/0145907 A1 | * | 6/2007 | Hwang et al. | 315/224 |
| 2007/0210723 A1 | * | 9/2007 | Kumagai et al. | 315/209 M |
| 2007/0222398 A1 | * | 9/2007 | Chen et al. | 315/291 |

* cited by examiner

*Primary Examiner*—Tuyet Vo
(74) *Attorney, Agent, or Firm*—Shaun P. Montana

(57) ABSTRACT

A circuit (10) for powering a halogen lamp (20) comprises an inverter (100) and an output circuit (300). During operation, the inverter (100) and output circuit (300) provide a magnitude-limited current to the halogen lamp such that the lamp power during an initial period is substantially less than the lamp power during a steady-state operating period. Preferably, output circuit (300) is a non-isolated circuit that includes a current-limiting inductance, and inverter (100) includes a frequency control circuit (R2,C4,C7,Q3,R3,R5,C8) for operating the inverter at a higher frequency during the initial period so as to reduce stress upon the lamp filament and preserve the operating life of the lamp. The circuit (10) is especially suitable for powering low voltage halogen lamps.

18 Claims, 2 Drawing Sheets

POWER SUPPLY FOR HALOGEN LAMP HAVING AN INVERTER AND OUTPUT CIRCUIT

FIELD OF THE INVENTION

The present invention relates to the general subject of circuits for powering lamps. More particularly, the present invention relates to circuits for powering halogen lamps with low filament voltage requirements.

BACKGROUND OF THE INVENTION

A halogen lamp that includes a low voltage filament (e.g., rated for operation with a filament voltage of 50 volts or less) provides significant advantages in comparison with a halogen lamp for which the filament is rated for excitation by a typical alternating current (AC) power source (e.g., 120 volts or more). A low voltage halogen lamp operates at a higher current and at a higher temperature, and provides visible light having a color spectrum that is preferred over that which is provided by higher voltage halogen lamps. Moreover, a low voltage halogen lamp has a filament with a larger cross-section area and a shorter length, which makes the lamp last longer. Optically, the filament of a low voltage halogen lamp more closely approximates an ideal point light source, as it provides (in comparison with a filament having a greater length) improved focus with the reflector in the lamp. Thus, a halogen lamp that includes a low voltage filament provides a highly desirable type of illumination.

A low voltage halogen lamp cannot be connected directly to a conventional AC power source. Because the voltage of the AC power source is significantly higher than the rated voltage of the filament/lamp, direct application of the AC power source voltage to the lamp would damage the filament. Consequently, some form of power supply is required in order to at least step down (i.e., reduce) the voltage provided by the AC power source to a level that is suitable for operating the lamp. The predominant power supply for this purpose is commonly referred as an "electronic transformer," which essentially operates as a constant voltage source. In practice, an electronic transformer is coupled between the AC power source and the halogen lamp, and is generally situated with a housing that is separate from the lamp; with regard to the latter point, safety purposes dictate that the electronic transformer must have an output that is electrically isolated from earth ground in order to preclude any potential hazard involving electrical shock. Typically, such electrical isolation is provided by including an output transformer within the power supply. Unfortunately, an output transformer tends to add significant material cost and physical size, and also detracts from the overall energy efficiency of the power supply.

When the filament of a halogen lamp is "cold" (i.e., as when power is first applied to the lamp), the resistance of the lamp filament is dramatically lower than when the filament is "hot" (i.e., as when power has been applied to the lamp for some time). The resistance of a cold filament can be as low as one-twentieth of the resistance of a hot filament. When the lamp is powered by a circuit (e.g., an electronic transformer) that essentially operates as a constant voltage source, the current that flows through the lamp during an initial period after power is first applied (i.e., when the filament is cold) will be dramatically greater than the steady-state operating current that flows through the lamp once the filament warms up. The relatively high current that flows during the initial period subjects the lamp filament, as well as the components within the power supply, to high amounts of stress that may damage the lamp filament and/or the components within the power supply, and that, over time, negatively impacts the operating life of the lamp and/or the reliability of the power supply.

Therefore, a need exists for a power supply circuit for low voltage halogen lamps that is capable of being realized in a highly economical and energy efficient manner. A need also exists for a power supply circuit that may be readily placed within the base of the lamp. A further need exists for a power supply circuit that reduces and/or limits the lamp current provides to a cold filament so as to protect the filament and the power supply circuit and thereby safeguard the operating life of the lamp and the reliability of the power supply circuit. A power supply circuit with these advantages would represent a considerable advance over the prior art.

DETAILED DESCRIPTION OF THE PREFERRED EMBODIMENTS

Figure 1:
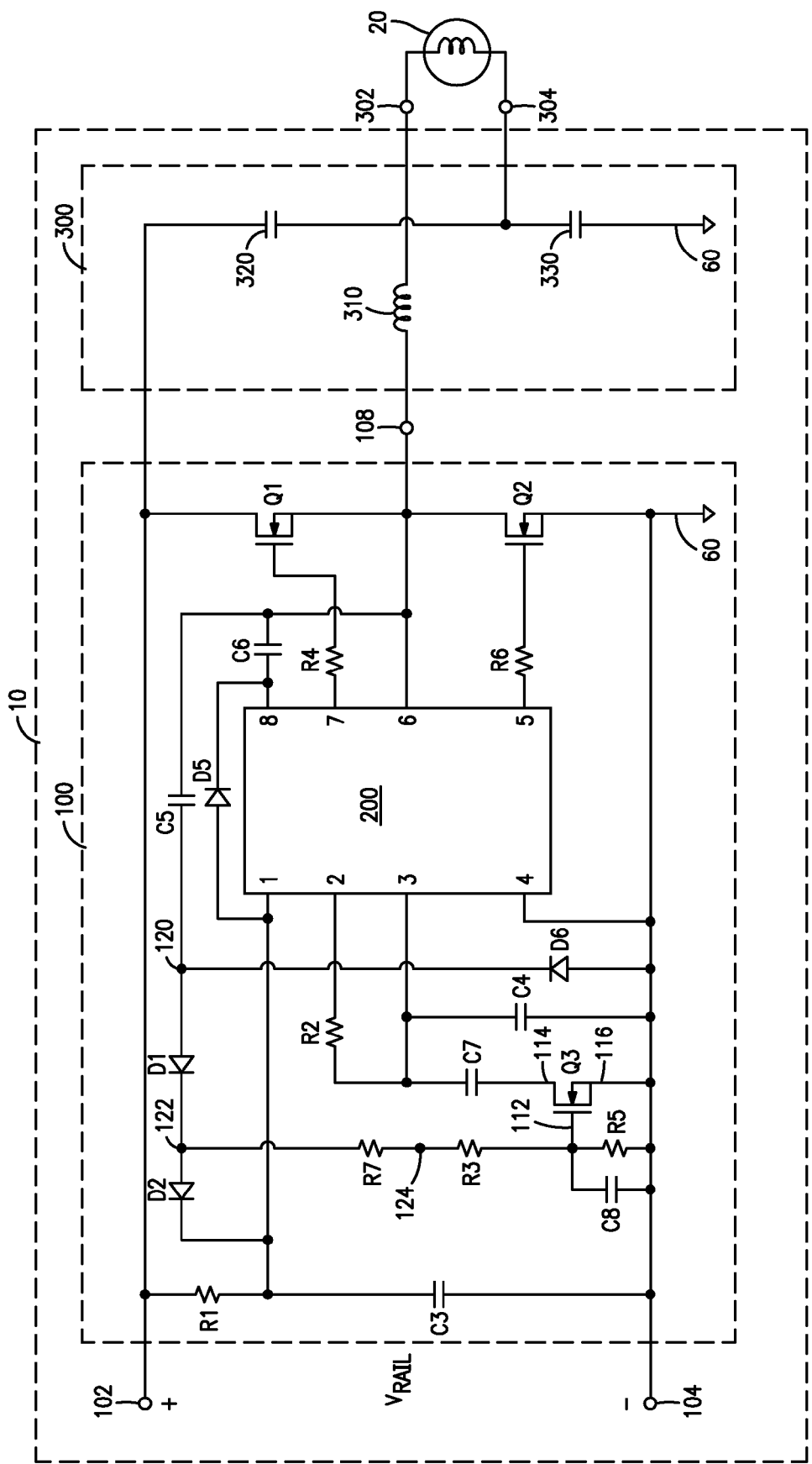
FIG. 1 describes a circuit for powering at least one halogen lamp, in accordance with a preferred embodiment of the present invention.
Figure 2:
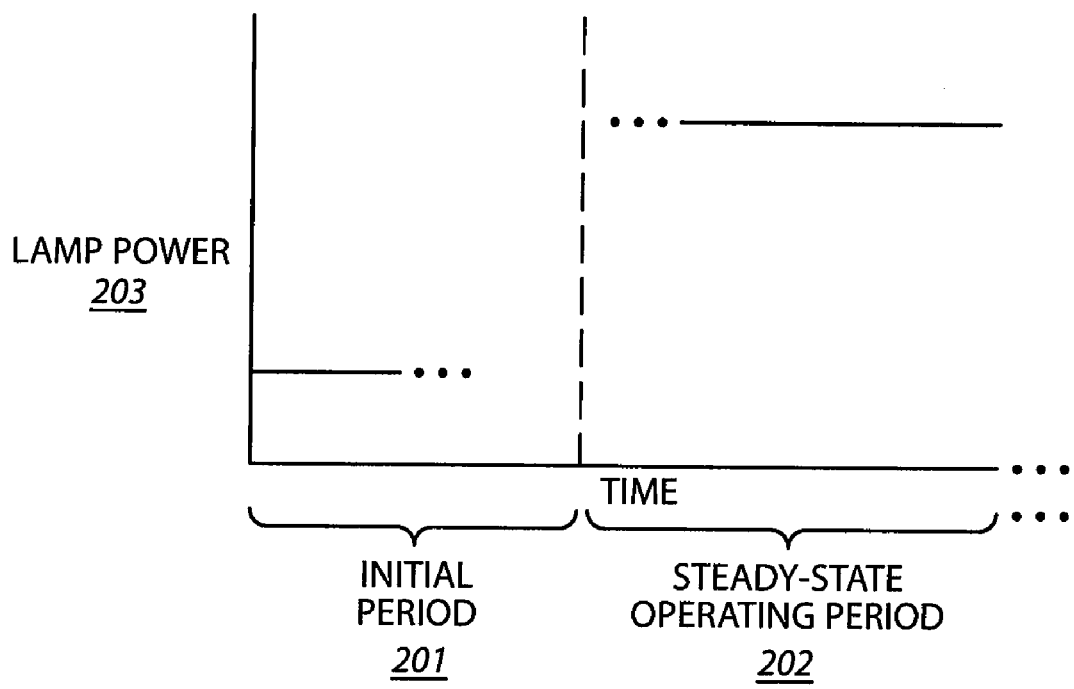
FIG. 2 describes lamp power for powering at least one halogen lamp, in accordance with at least one embodiment of the present invention.

FIG. 1 describes a circuit 10 for powering at least one halogen lamp 20. Circuit 10 comprises an inverter 100 and an output circuit 300. During operation, and as shown in FIGS. 1-2, circuit 10, via inverter 100 and output circuit 300, provides a magnitude-limited current to halogen lamp 20 such that the lamp power 203 during an initial period 201 (hereinafter also referred to as a "soft start" period) is substantially less than the lamp power during a steady-state operating period 202.

Advantageously, circuit 10 essentially operates as a constant current source and provides a "soft start" feature that enhances the useful operating life of lamp 20 by limiting the electrical stress upon the lamp filament during the initial stages of operation (i.e., when the lamp filament is still cold, with a correspondingly low resistance) for low-voltage halogen lamps. This is in contrast with the operation of many existing approaches, such as so-called "electronic transformers," wherein the lamp filament is subject to high levels of electrical stress during the initial stages of operation. The "soft start" feature of circuit 10 is enhanced by various preferred structural and operational refinements that are described in further detail herein.

In a preferred embodiment of circuit 10, inverter 100 includes first and second inverter input terminals 102,104, an inverter output terminal 108, first and second inverter switches Q1,Q2, and an inverter control circuit (which includes the remaining components depicted within block 100 in FIG. 1). First and second inverter input terminals 102,104 are adapted to receive a substantially direct current (DC) voltage source, $V_{RAIL}$, such as that which is commonly provided by a combination of a full-wave rectifier (which receives a conventional source of AC voltage, such as 120 volts rms at 60 hertz) and a suitable DC-to-DC converter circuit (e.g., a buck converter); by way of example, when circuit 10 is utilized for powering a PAR38 type 35 watt halogen lamp, $V_{RAIL}$ is selected to have a value that is on the order of about 120 volts.

Inverter 100 receives $V_{RAIL}$ and provides a substantially alternating current (AC) output voltage at inverter output terminal 108. More specifically, in the preferred half-bridge arrangement depicted in FIG. 1, the inverter output voltage (as taken between inverter output terminal 108 and circuit ground 60) is a substantially squarewave voltage that periodically varies between $V_{RAIL}$ and zero. First and second inverter switches Q1,Q2 (commonly realized by N-channel field-effect transistors) are coupled to inverter input terminals 102, 104 and inverter output terminal 108. The inverter control circuit is coupled to first and second inverter switches Q1,Q2. During operation, the inverter control circuit provides substantially complementary commutation of inverter switches Q1,Q2, such that when Q1 is on, Q2 is off, and vice-versa.

Figure 3:
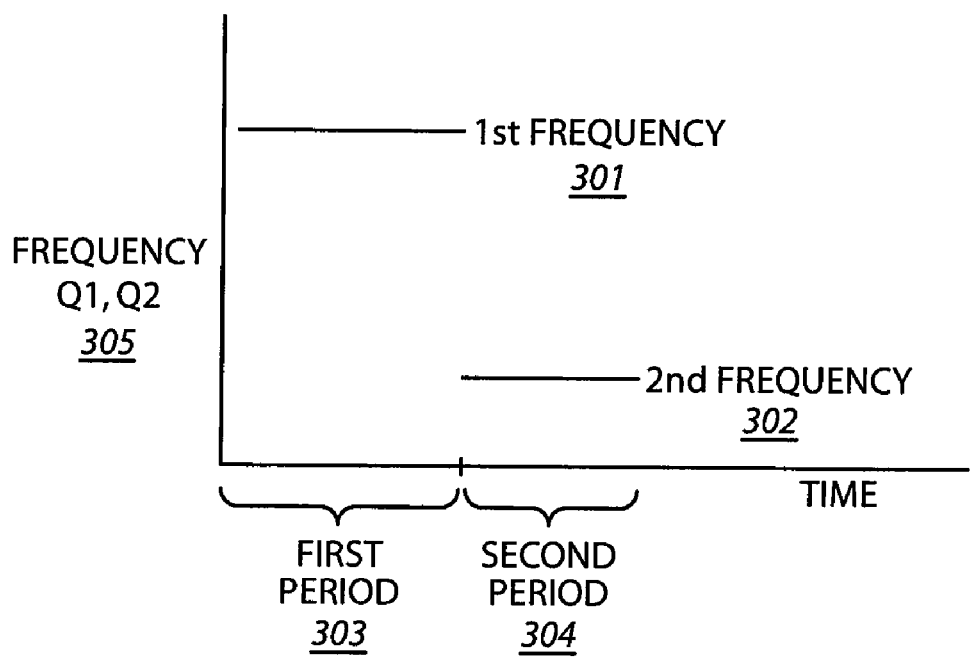
FIG. 3 describes frequency for powering at least one halogen lamp, in accordance with at least one embodiment of the present invention.

In a preferred embodiment of circuit 10, and with momentary reference as well to FIG. 3, the inverter control circuit operates such that: (i) during a first period 303, the inverter control circuit commutates inverter switches Q1,Q2 at a first (i.e., relatively high) frequency 301; and (ii) during a second period 304 following the first period 303, the inverter control circuit commutates inverter switches Q1,Q2 at a second frequency 302 that is lower than the first frequency 301.

The first period corresponds to a time period during which circuit 10 first begins to operate and to provide power to lamp 20. During the first time period, the filament of lamp 20 is initially cold and begins the process of warming up. Accordingly, during the first period, inverter 100 is preferably operated at a relatively high frequency so as to ensure that the current supplied to the lamp is at a relatively low level. With the current limited to a relatively low level, the lamp power increases as the filament warms up and its resistance correspondingly increases.

The second period, which occurs after the first period, corresponds to the steady-state operating period, at which point the filament of lamp 20 has warmed up sufficiently so as to safely allow circuit 10 to provide a higher level of current without subjecting the filament and the components of circuit 10 to any undue stress. Accordingly, during the second period, inverter 100 is preferably operated at a frequency that is lower than the first frequency.

Further details as to a preferred structure for realizing the inverter control circuit are discussed herein.

As described in FIG. 1, output circuit 300 is preferably realized as a non-isolated output circuit. A non-isolated output circuit (i.e., one lacking an output transformer for providing electrical isolation between circuit 10 and lamp 20) is preferred as it allows circuit 10 to be realized in a substantially more cost-effective and space-efficient manner than would otherwise be possible. Among other benefits, a non-isolated output circuit makes it possible for circuit 10 to be realized with a physical volume that is small enough so that circuit 10 can be situated within a lamp base portion of halogen lamp 20. As will be appreciated by those skilled in the art, the option of housing both circuit 10 and halogen lamp 20 within a single package is a highly attractive capability that encourages retrofit applications wherein an existing AC line voltage powered (e.g., 120 volt) halogen lamp may be quickly and inexpensively replaced by the single package containing the combination of circuit 10 and halogen lamp 20.

Referring to FIG. 1, output circuit 300 includes first and second output connections 302,304, a current-limiting inductance 310, and one or both of a first direct current (DC) blocking capacitance 320 and a second direct current (DC) blocking capacitance 330. First and second output connections 302,304 are adapted for coupling to halogen lamp 20. Current-limiting inductance 310 is coupled between inverter output terminal 108 and first output connection 302. First DC blocking capacitance 320 is coupled between first inverter input terminal 102 and second output connection 304. Second DC blocking capacitance 330 is coupled between second output connection 304 and circuit ground 60. It will be understood by those skilled in the art that output circuit 300 is generally capable of being realized, and of providing proper operation, with either only one or both of DC blocking capacitors 320,330 being present.

During operation of circuit 10, output circuit 300 receives the AC output voltage provided by inverter 100 and supplies a magnitude-limited current to lamp 20. The presence of current-limiting inductance 310 is central to that function, as it allows circuit 10 to essentially behave as a current source. Consequently, and in contrast with existing approaches which essentially operate as voltage sources, the amount of current supplied to the filament of lamp 20 is largely unaffected by the resistance of the lamp filament. As a result, the amount of power in the lamp filament (also referred to herein as the "lamp power") will not be excessively high during the initial period when the filament is cold and its resistance is correspondingly low. Additionally, because inductance 310 provides an impedance that is proportional to frequency, the series impedance presented by inductance 310, and consequently the current provided to lamp 20, can be adjusted via appropriate control of the inverter operating frequency (as previously described). DC blocking capacitors 320,330 (also commonly referred to as "half-bridge capacitors") are present in order to provide a voltage offset (equal to about one-half of $V_{RAIL}$) such that the voltage that is provided to lamp 20 (i.e., the voltage between first and second output connections 302, 304) is devoid of any substantial DC component. As previously mentioned, and as known to those skilled in the art, output circuit 300 may be realized either with both DC blocking capacitors 320,330 being present (as described in FIG. 1) or with only one of the DC blocking capacitors 320,330 being present; the only relevant differences between using both DC blocking capacitors 320,330 and using only one of DC blocking capacitors 320,330 involve certain practical design considerations (e.g., electromagnetic interference) that are not central to practicing the present invention.

In a preferred embodiment of circuit 10, the inverter control circuit comprises a number of sub-circuits, including an inverter driver circuit 200, a startup circuit (R1,C3), a bootstrapping circuit (C5,D1,D2,D6), and a frequency control circuit (R2,C4,C7,Q3,R3,R5,C8). The inverter control circuit also includes several associated peripheral components, such as resistors R4,R6, capacitor C6, and diode D5, the functions of which are known to those skilled in the art.

Inverter driver circuit 200 is coupled to first and second inverter switches Q1,Q2, and includes a DC supply input (pin 1), a first frequency control input (pin 2), and a third frequency control input (pin 3); inverter driver circuit 200 also includes other inputs/outputs (pins 4,5,6,7,8), the functions of which are known to those skilled in the art and which are not described in further detail herein. Inverter driver circuit 200 may be realized by appropriate circuitry or by a suitable device, such as the IR2153 high-side driver integrated circuit manufactured by International Rectifier.

Startup circuit (R1,C3) is coupled between first and second inverter input terminals 102,104 and the DC supply input (pin 1) of inverter driver circuit 200. The function of startup circuit (R1,C3) is to provide voltage/power for initially activating inverter driver circuit 200. Preferably, as described in FIG. 1, the startup circuit includes a startup resistor R1 and a startup capacitor C3. Startup resistor R3 is coupled between first inverter input terminal 102 and the DC supply input (pin 1). Startup capacitor C3 is coupled between the DC supply input (pin 1) and circuit ground 60. During operation, when power is first applied to circuit 10 (i.e., when $V_{RAIL}$, or at least a fraction of the steady-state operating value thereof, appears between inverter input terminals 102,104), a charging current flows into C3 by way of first inverter input terminal 102 and resistor R1. That charging current causes the voltage across C3 to build up. Once the voltage across C3 reaches a certain level, corresponding to a predetermined turn-on voltage for inverter driver circuit 200, inverter driver circuit 200 turns on and begins to provide commutation of inverter transistors Q1,Q2. A portion of the stored energy in capacitor C3 ensures that inverter driver circuit 200 continues to operate until at least such time as bootstrapping circuit (C5,D1,D2,D6) begins to operate.

Bootstrapping circuit (C5,D1,D2,D6) is coupled between inverter output terminal 108 and DC supply input (pin 1) of inverter driver circuit 200. The function of bootstrapping circuit (C5,D1,D2,D6) is to provide voltage/power for operating inverter driver circuit 200 on a steady-state basis; that is, within a short time after inverter driver circuit 200 is initially activated by startup circuit (R1,C3), bootstrapping circuit (C5,D1,D2,D6) takes over and supplies the operating voltage/power requirements of inverter driver circuit 200. Preferably, as described in FIG. 1, the bootstrapping circuit is realized by a so-called charge-pump circuit comprising a bootstrapping capacitor C5, a first diode D6, a second diode D1, and a third diode D2. Bootstrapping capacitor C5 is coupled between inverter output terminal 108 and a first node 120. First diode D6 (orientated as shown in FIG. 1) is coupled between first node 120 and circuit ground 60. Second diode D1 (orientated as shown in FIG. 1) is coupled between first node 120 and a second node 122. Third diode D2 (orientated as shown in FIG. 1) is coupled between second node 122 and DC supply input (pin 1) of inverter driver circuit 200. During operation, once inverter driver circuit 200 begins to operate and provide complementary commutation of inverter transistors Q1,Q2, a substantially squarewave voltage (periodically varying between $V_{RAIL}$ and zero) appears between inverter output terminal 108 and circuit ground 60. A small current from inverter output terminal 108 is capacitively coupled (via bootstrapping capacitor C5), half-wave rectified (via operation of diodes D6,D1), and coupled (via diode D2) to capacitor C3 and DC supply input (pin 1) of inverter driver circuit 200, thereby providing steady-state operating current to inverter driver circuit 200 and ensuring that the voltage across capacitor C3 (i.e., the voltage between pin 1 of inverter driver circuit 200 and circuit ground 60) is sufficient for continued operation of inverter driver circuit 200. Diode D2 serves to effectively isolate the bootstrapping circuit from the startup circuit (R1,C3) and thereby block any current that might otherwise flow from inverter input terminal 102, and through resistor R1, and negatively affect the intended operation of frequency control circuit (R2,C4,C7,Q3,R3,R5,C8).

Frequency control circuit (R2,C4,C7,Q3,R3,R5,C8) is coupled to bootstrapping circuit (C5,D1,D2,D6) and to first and second frequency control inputs (pins 2 and 3) of inverter driver circuit 200. The basic function of frequency control circuit (R2,C4,C7,Q3,R3,R5,C8) is to control the frequency at which inverter driver circuit 200 commutates inverter transistors Q1,Q2 and, correspondingly, to control the frequency of the inverter output voltage (i.e., the substantially squarewave voltage that is provided between inverter output terminal 108 and circuit ground 60) and, ultimately, the frequency and magnitude of the current that is supplied to halogen lamp 20.

Although it is within the contemplated scope of the present invention that inverter driver circuit 200 may be operated at a single frequency and still allow circuit 10 to effectively limit the lamp current/power to within appropriate levels, it is preferred that inverter driver circuit 200 be operated at different frequencies during a first period (i.e., when the lamp filament is in the process of warming up) and during a second period (i.e., when the lamp filament has reached a considerable operating temperature). Accordingly, in a preferred embodiment of ballast 10, frequency control circuit (R2,C4, C7,Q3,R3,R5,C8) controls the operation of inverter driver circuit 200 such that: (i) during the first period, inverter driver circuit 200 is directed to commutate inverter transistors Q1,Q2 at a first frequency; and (ii) during the second period, inverter driver circuit 200 is directed to commutate inverter transistors Q1,Q2 at a second frequency that is lower than the first frequency.

As described in FIG. 1, the frequency control circuit preferably comprises a frequency-determining resistance R2, a first frequency-determining capacitance C4, a second frequency-determining capacitance C7, and a frequency-shifting circuit (Q3,R3,R5,C8). Frequency-determining resistance R2 is coupled between first and second frequency control inputs (pins 2 and 3) of inverter driver circuit 200. First frequency-determining capacitance C4 is coupled between second frequency control input (pin 3) and circuit ground 60. Second frequency determining capacitance C7 is coupled to second frequency control input (pin 3). Frequency-shifting circuit (Q3,R3,R5,C8) is coupled to bootstrapping circuit (C5,D1,D2,D6) and to second frequency-determining capacitance C7.

During operation, frequency-shifting circuit (Q3,R3,R5, C8) is not active during the first period; correspondingly, the operating frequency of inverter driver circuit 200 is determined by (i.e., is inversely proportional to the product of) the resistance of R2 and the capacitance of C4. During the second period, frequency-shifting circuit (Q3,R3,R5,C8) effectively places second-frequency determining capacitance C7 in parallel with first-frequency determining capacitance C4. This increases the equivalent frequency-determining capacitance from C4 (which is the equivalent frequency-determining capacitance during the first period) to C4+C7 (which is the equivalent frequency-determining capacitance during the second period), thereby reducing the operating frequency of inverter driver circuit 200 from the first frequency (which is inversely proportional to the product of the resistance of R2 and the capacitance of C4) during the first period to the second frequency (which is inversely proportional to the product of the resistance of R2 and the sum of the capacitances of C4 and C7) during the second period. In this way, frequency-shifting circuit (Q3,R3,R5,C8) controls the operating frequency of inverter control circuit 200 and provides circuit 10 with a useful capability for providing an enhanced "soft start" feature wherein lamp 20 is initially operated (i.e., during the first period) at a substantially reduced power level that minimizes stresses upon the lamp filament and upon the components within circuit 10.

In a preferred embodiment of circuit 10, as described in FIG. 1, the frequency-shifting circuit comprises an electronic switch Q3, a first biasing resistance R3, a second biasing resistance R5, and a timing capacitance C8. Electronic switch Q3 is preferably realized by a N-channel field effect transistor (FET) having a gate terminal 112, a drain terminal 114, and a source terminal 116. Drain terminal 114 is coupled to second frequency-determining capacitance C7, and source terminal 116 is coupled to circuit ground 60. First biasing resistance R3 is operably (i.e., not necessarily directly) coupled between second node 122 and gate terminal 112 of FET Q3. Second biasing resistance R5 and timing capacitance C8 are each coupled between gate terminal 112 and circuit ground 60.

During operation, in the first period, FET Q3 is off and remains off until such time (i.e., at the start of the second period) as the voltage between gate terminal 112 and circuit ground 60 reaches a level (e.g., +5 volts or so) that is sufficient to activate FET Q3. Accordingly, during the first period, FET Q3 is non-conductive (between drain 114 and source 116), so capacitor C7 is not coupled in parallel with capacitor C4. Correspondingly, during the first period, the operating frequency of inverter control circuit 200 is dictated by R2 and C4.

During the first period, once inverter 100 and bootstrapping circuit (C5,D1,D2,D6) begin to operate, timing capacitor C8 begins to charge up from second node 122 via resistor R3. By the completion of the first period (i.e., at the start of the second period), the voltage across timing capacitor C8 reaches a level (e.g., +5 volts or so) that is sufficient to activate FET Q3. At that point, with FET Q3 turned on, capacitor C7 is effectively coupled circuit ground 60; that is, capacitor C7 is effectively coupled in parallel with capacitor C4, thereby increasing the effective frequency-determining capacitance that is "seen" at pin 3 of inverter driver circuit 200. Correspondingly, the operating frequency of inverter 100 is reduced from the first frequency to the second frequency, and remains at the second frequency for as long as FET Q3 remains on.

It should be understood that the time duration of the first period is determined by the RC time constant involving resistances R3,R5 and timing capacitance C8. For an application involving a PAR38 type 35 watt halogen lamp, and in order to ensure an adequate "soft start" period, it is preferred that the time duration of the first period be set at between about 0.5 and 1 second. To provide this preferred time duration for the first period, it is suggested that timing capacitance C8 be selected to have a capacitance of about one microfarad, that resistor R3 be selected to have a resistance of about 2 megohms, and that resistor R5 be selected to have a resistance of about 2 megohms.

Preferably, as described in FIG. 1, the frequency-shifting circuit further comprises a positive-temperature-coefficient (PTC) resistance R7 (coupled between second node 122 and a third node 124) that provides over-temperature protection for circuit 10.

In the absence of PTC resistance R7, once FET Q3 is turned on at the start of the second period, FET Q3 will remain on for an indefinite period of time (i.e., as long as inverter 100 continues to operate); correspondingly, inverter 100 will continue to operate at the second (lower) frequency and circuit 10 will continue to provide a relatively high level of current for steady-state operation of halogen lamp 20.

With PTC resistance R7 being present, in the event of an over-temperature condition within circuit 10, R7 will function as an open circuit; absent an over-temperature condition, R7 functions as a low value resistance (i.e., having a resistance that is negligible in comparison with the resistance of R3). When an over-temperature condition occurs, and with R7 acting as an open circuit, C8 is deprived of charging current; at the same time, the stored energy in C8 is gradually depleted, primarily by discharge through R5. As a result, the voltage across C8 will eventually fall to a level that is low enough to deactivate FET Q3. With FET Q3 turned off, the frequency-shifting circuit is effectively disengaged, thereby causing the operating frequency of inverter 100 to go from the second (i.e., lower) frequency to the first (i.e., higher) frequency. With inverter 100 operating at the first frequency, circuit 10 supplies a correspondingly lower amount of current/power to halogen lamp 20. In this way, PTC resistance R7 allows circuit 10 to respond to an over-temperature condition by reducing the amount of current provided by circuit 10. It is expected that the correspondingly lower amount of current/power provided by circuit 10 to lamp 20 is sufficient to reduce and/or eliminate the over-temperature condition so as to avoid any negative impact upon the safety or reliability of circuit 10 and halogen lamp 20.

Although the present invention has been described with reference to certain preferred embodiments, numerous modifications and variations can be made by those skilled in the art without departing from the novel spirit and scope of this invention.

What is claimed is:

1. A circuit for powering at least one halogen lamp, the circuit comprising:
   an inverter; and
   an output circuit coupled between the inverter and the at least one halogen lamp;
   wherein the inverter and output circuit are operable to provide a magnitude-limited current to the at least one halogen lamp, such that the lamp power during an initial period is substantially less than the lamp power during a steady-state operating period;
   wherein the inverter comprises:
      first and second inverter input terminals for receiving a substantially direct current (DC) voltage source;
      an inverter output terminal, at which the inverter provides a substantially alternating current (AC) output voltage;
      first and second inverter switches coupled to the inverter input terminals and to the inverter output terminal; and
      an inverter control circuit coupled to the first and second inverter switches, and operable:
         (i) during a first period, to commutate the inverter switches at a first frequency; and
         (ii) during a second period following the first period, to commutate the inverter switches at a second frequency, wherein the second frequency is lower than the first frequency;
   and wherein the inverter control circuit comprises:
      an inverter driver circuit coupled to the first and second inverter switches, the inverter driver circuit including a DC supply input, a first frequency control input, and a second frequency control input;
      a startup circuit coupled between the first and second inverter input terminals and the DC supply input of the inverter driver circuit;
      a bootstrapping circuit coupled between the output terminal of the inverter and the DC supply input of the inverter driver circuit; and
      a frequency control circuit coupled to the bootstrapping circuit and to the first and second frequency control inputs of the inverter driver circuit, wherein the frequency control circuit is operable;
         (i) during the first period, to direct the inverter driver circuit to commutate the inverter switches at the first frequency; and
         (ii) during the second period, to direct the inverter driver circuit to commutate the inverter switches at the second frequency.

2. The circuit of claim 1, wherein the output circuit is non-isolated.

3. The circuit of claim 1, wherein the output circuit comprises:
   first and second output connections adapted for coupling to the at least one halogen lamp;
   a current-limiting inductance coupled between the inverter output terminal and the first output connection; and at least one of:
   a first direct current (DC) blocking capacitance coupled between the first inverter input terminal and the second output connection; and
   a second direct current (DC) blocking capacitance coupled between the second output connection and circuit ground.

4. The circuit of claim 1, wherein the bootstrapping circuit is a charge-pump circuit.

5. The circuit of claim 1, wherein the bootstrapping circuit comprises:
   a bootstrapping capacitor coupled between the inverter output terminal and a first node;
   a first diode coupled between the first node and circuit ground;
   a second diode coupled between the first node and a second node; and
   a third diode coupled between the second node and the DC supply input of the inverter driver circuit.

6. The circuit of claim 1, wherein the frequency control circuit comprises:
   a frequency-determining resistance coupled between the first and second frequency control inputs of the inverter driver circuit;
   a first frequency-determining capacitance coupled between the second frequency control input of the inverter driver circuit and circuit ground;
   a second frequency-determining capacitance coupled to the second frequency control input of the inverter driver circuit; and
   a frequency-shifting circuit coupled to the bootstrapping circuit and to the second frequency-determining capacitance, and operable, during the second period, to effectively place the second frequency-determining capacitance in parallel with the first frequency-determining capacitance.

7. The circuit of claim 6, wherein the frequency-shifting circuit comprises:
   an electronic switch having a gate terminal, a drain terminal, and a source terminal, wherein the drain terminal is coupled to the second frequency-determining capacitance, and the source terminal is coupled to circuit ground;
   a first biasing resistance operably coupled between the second node and the gate terminal of the electronic switch;
   a second biasing resistance coupled between the gate terminal of the electronic switch and circuit ground; and
   a timing capacitance coupled between the gate terminal of the electronic switch and circuit ground.

8. The circuit of claim 7, wherein the electronic switch is a N-channel field-effect transistor.

9. The circuit of claim 7, wherein the frequency-shifting circuit further comprises a positive-temperature-coefficient (PTC) resistance coupled between the second node and a third node, and coupled in series with the first biasing resistance.

10. A circuit for powering a halogen lamp having a rated operating filament voltage that is substantially less than a voltage provided by a conventional alternating current (AC) power line voltage source, the circuit comprising:
   an inverter, comprising:
      first and second inverter input terminals for receiving the substantially direct current (DC) voltage source;
      an inverter output terminal;
      first and second inverter switches coupled to the inverter input terminals and to the inverter output terminal; and
      an inverter control circuit coupled to the first and second inverter switches, the inverter control circuit comprising:
         an inverter driver circuit coupled to the first and second inverter switches, the inverter driver circuit including a DC supply input, a first frequency control input, and a second frequency control input;
         a startup circuit coupled between the first and second inverter input terminals and the DC supply input of the inverter driver circuit;
         a bootstrapping circuit coupled between the output terminal of the inverter and the DC supply input of the inverter driver circuit; and
         a frequency control circuit coupled to the bootstrapping circuit and to the first and second frequency control inputs of the inverter driver circuit, wherein the frequency control circuit is operable:
            (i) during a first period, to direct the inverter driver circuit to commutate the inverter switches at the first frequency; and
            (ii) during a second period following the first period, to direct the inverter driver circuit to commutate the inverter switches at the second frequency that is substantially less than the first frequency; and
   a non-isolated output circuit coupled between the inverter and the halogen lamp.

11. The circuit of claim 10, wherein the rated operating filament voltage of the halogen is on the order of about 40 volts.

12. The circuit of claim 10, wherein the circuit occupies a physical volume that is small enough to allow the circuit to be situated within a lamp base portion of the halogen lamp.

13. The circuit of claim 10, wherein the non-isolated output circuit comprises:
   first and second output connections adapted for coupling to the halogen lamp;
   a current-limiting inductance coupled between the inverter output terminal and the first output connection; and
   at least one of:
      a first direct current (DC) blocking capacitance coupled between the first inverter input terminal and the second output connection; and
      a second direct current (DC) blocking capacitance coupled between the second output connection and circuit ground.

14. The circuit of claim 10, wherein the frequency control circuit comprises:
   a frequency-determining resistance coupled between the first and second frequency control inputs of the inverter driver circuit;
   a first frequency-determining capacitance coupled between the second frequency control input of the inverter driver circuit and circuit ground;
   a second frequency-determining capacitance coupled to the second frequency control input of the inverter driver circuit; and
   a frequency-shifting circuit coupled to the bootstrapping circuit and to the second frequency-determining capacitance, and operable, during the second period, to effectively place the second frequency-determining capacitance in parallel with the first frequency-determining capacitance.

15. The circuit of claim 14, wherein the frequency-shifting circuit comprises:
- an electronic switch having a gate terminal, a drain terminal, and a source terminal, wherein the drain terminal is coupled to the second frequency-determining capacitance, and the source terminal is coupled to circuit ground;
- a first biasing resistance operably coupled between the bootstrapping circuit and the gate terminal of the electronic switch; and
- a second biasing resistance coupled between the gate terminal of the electronic switch and circuit ground.

16. A circuit for powering at least one halogen lamp, the circuit comprising:
- an inverter, comprising:
  - first and second inverter input terminals adapted to receive a substantially direct current (DC) voltage source;
  - an inverter output terminal;
  - first and second inverter switches coupled to the inverter input terminals and to the inverter output terminal;
  - an inverter control circuit coupled to the first and second inverter switches, the inverter control circuit comprising:
    - an inverter driver circuit coupled to the first and second inverter switches, the inverter driver circuit including a DC supply input, a first frequency control input, and a second frequency control input;
    - a startup circuit coupled between the first and second inverter input terminals and the DC supply input of the inverter driver circuit;
    - a bootstrapping circuit coupled between the output terminal of the inverter and the DC supply input of the inverter driver circuit; and
    - a frequency control circuit coupled to the bootstrapping circuit and to the first and second frequency control inputs of the inverter driver circuit, wherein the frequency control circuit comprises:
      - a frequency-determining resistance coupled between the first and second frequency control inputs of the inverter driver circuit;
      - a first frequency-determining capacitance coupled between the second frequency control input of the inverter driver circuit and circuit ground;
      - a second frequency-determining capacitance coupled to the second frequency control input of the inverter driver circuit; and
      - a frequency-shifting circuit, comprising:
        - an electronic switch having a gate terminal, a drain terminal, and a source terminal, wherein the drain terminal is coupled to the second frequency-determining capacitance, and the source terminal is coupled to circuit ground;
        - a first biasing resistance operably coupled between the bootstrapping circuit and the gate terminal of the electronic switch;
        - a second biasing resistance coupled between the gate terminal of the electronic switch and circuit ground; and
        - a timing capacitance coupled between the gate terminal of the electronic switch and circuit ground; and
- an output circuit, comprising:
  - first and second output connections adapted for coupling to the at least one halogen lamp;
  - a current-limiting inductance coupled between the inverter output terminal and the first output connection; and
  - at least one of:
    - a first direct current (DC) blocking capacitance coupled between the first inverter input terminal and the second output connection; and
    - a second direct current (DC) blocking capacitance coupled between the second output connection and circuit ground.

17. The circuit of claim 16, wherein the bootstrapping circuit comprises:
- a bootstrapping capacitor coupled between the inverter output terminal and a first node;
- a first diode coupled between the first node and circuit ground;
- a second diode coupled between the first node and a second node; and
- a third diode coupled between the second node and the DC supply input of the inverter driver circuit.

18. The circuit of claim 16, wherein the frequency-shifting circuit further comprises a positive-temperature-coefficient (PTC) resistance coupled between the second node and a third node, and coupled in series with the first biasing resistance.

* * * * *